No. 628,572. Patented July 11, 1899.
C. L. BELL.
SCALE.
(Application filed Apr. 29, 1898.)
(No Model.) 2 Sheets—Sheet 1.

Witnesses
J. Frank Culverwell

Chester L. Bell, Inventor.
By his Attorneys.
C. A. Snow & Co.

No. 628,572. Patented July 11, 1899.
C. L. BELL.
SCALE.
(Application filed Apr. 29, 1898.)
(No Model.) 2 Sheets—Sheet 2.

Witnesses Chester L. Bell, Inventor,
By his Attorneys,

UNITED STATES PATENT OFFICE.

CHESTER L. BELL, OF EL PASO, TEXAS.

SCALE.

SPECIFICATION forming part of Letters Patent No. 628,572, dated July 11, 1899.

Application filed April 29, 1898. Serial No. 679,199. (No model.)

*To all whom it may concern:*

Be it known that I, CHESTER L. BELL, a citizen of the United States, residing at El Paso, in the county of El Paso and State of Texas, have invented a new and useful Scale, of which the following is a specification.

My invention relates to scales, and has for its object to provide a simple and improved multiple scale adapted to facilitate the weighing of widely-varying quantities with the same machine without the necessity of adjusting the counterpoises or without the substitution of counterpoises of different weights, a scale of the class to which my invention belongs being particularly adapted for use as track-scales.

A further object of the invention is to provide, in connection with interdependent scale-beams, an improved construction of "tare-beam" and connections adapted for weighing empty vessels, vehicles, cars, &c., prior to the weighing of the contents thereof, the arrangement of the parts being such that when the loaded receptacle is placed upon the platform of the scale the scale-beams indicate the exact weight of the contents without the necessity of deducting the tare.

Further objects and advantages of this invention will appear in the following description, and the novel features thereof will be particularly pointed out in the appended claims.

Figure 1:
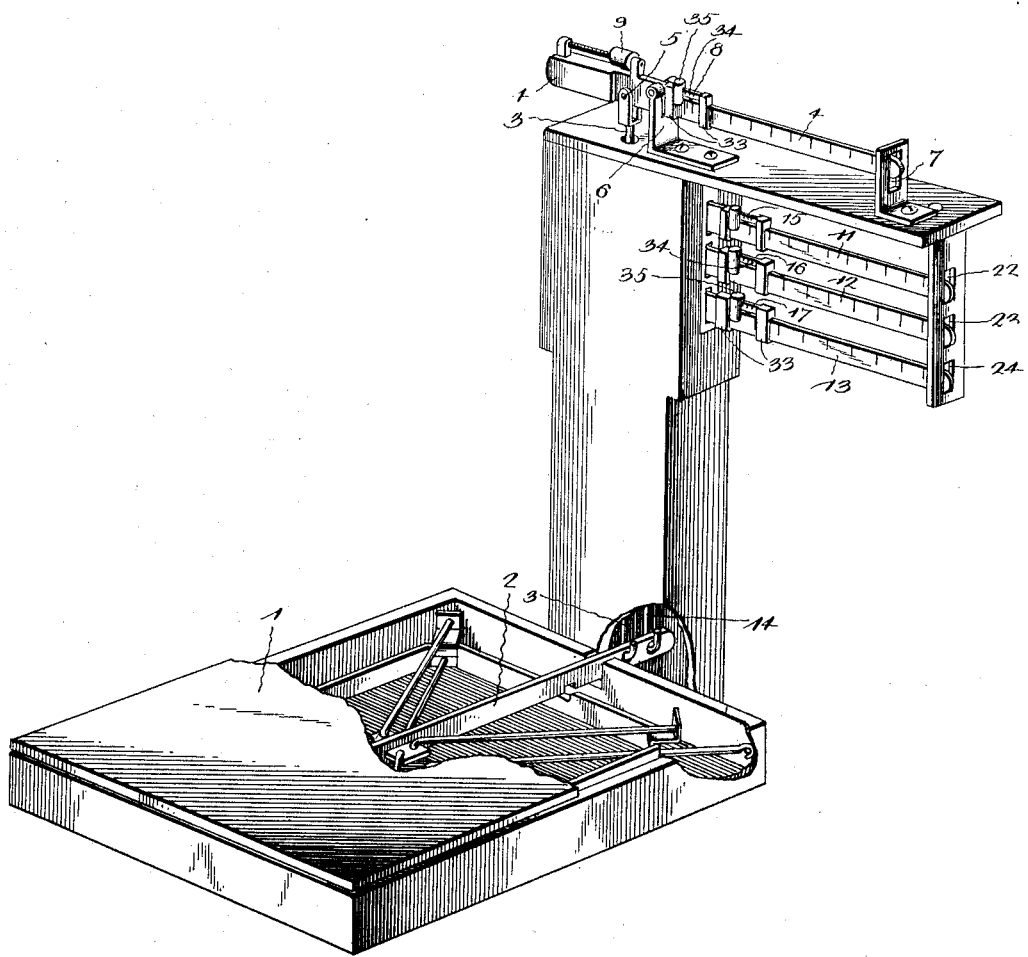
Figures 2, 3:
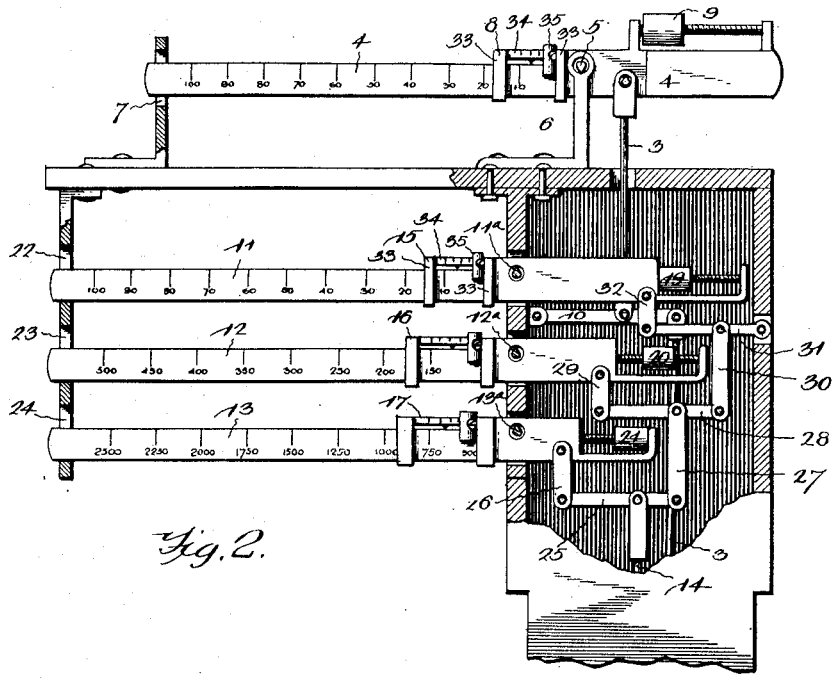

In the drawings, Figure 1 is a perspective view of a scale having weighing-beams constructed and connected in accordance with my invention. Fig. 2 is an elevation, partly broken away, of the weighing-beams, showing poises of different weights. Fig. 3 is a similar view showing weighing-poises of equal weights. Fig. 4 is a detail view of the connections between the platform-lever and the scale-beam-operating rods.

Similar numerals of reference indicate corresponding parts in all the figures of the drawings.

Mounted in a suitable frame and supporting a platform 1 is a platform-lever 2, connected by a rod 3 with a tare-beam 4, fulcrumed by suitable knife-edge pivots 5 upon a standard 6 and arranged with its free end in a guide 7. Said tare-beam carries a weighing-poise 8, adapted for adjustment parallel with the beam to register with the several graduations thereof, which in practice may be arranged to indicate any desired weights from an ounce upward. Said tare-beam is also provided with an adjustable counterpoise 9, and the connecting-rod 3 between the platform-lever and the tare-beam is preferably sectional, with an interposed lever 10 of the second order, whereby the motion of the beam is reduced in proportion to that of the platform-lever.

In connection with the above-described mechanism I employ a series of weighing-beams 11, 12, and 13, it being understood that while only three beams are illustrated in the drawings a greater or less number may be employed, according to the desired capacity of the apparatus. These weighing-beams are of different denominations, that of lowest denomination being the uppermost or that which is most remote from the point of application of weight through the steelyard-rod 14, this weight-rod being in connection with the beam of highest denomination. These weighing-beams are fulcrumed, respectively, at $11^a$, $12^a$, and $13^a$, and upon each of them is mounted for adjustment a weighing-poise, which are respectively designated as 15, 16, and 17, and mounted upon the heel of each weighing-beam is a counterpoise similar to that which is employed upon the tare-beam and which are respectively designated by the numerals 19, 20, and 21. Also each weighing-beam operates in a guide between fixed terminal stops, the guides of the uppermost, intermediate, and lowermost beams being designated by the numerals 22, 23, and 24 and the upward movement of each beam being limited in order to secure a certain coöperation between the weighing-beams. This coöperation is attained by a system of connections between the weighing-beams, whereby each remains at rest until the weighing-beam of next lower denomination has reached the limit of its upward movement, all of the weighing-beams having an approximately equal extent of movement. In the construction illustrated the steelyard-rod 14 is suspended upon a connecting-lever 25 at an intermediate point, said lever being connected with the lowermost weighing-beam or that of highest denomination by means of a link 26 at a point in rear of the pivotal point of the beam. The other end of said connecting-lever is connected by a link 27 with a second connecting-lever 28 at an intermediate point, said second connecting-lever being suspended at one end from the scale-beam of next lower denomination by a link 29 and having connection by a link 30 with an intermediate point of a third connecting-lever 31. This third connecting-lever is suspended at one end from the heel of the scale-beam of next lower denomination (or in this instance from the scale-beam of lowest denomination) by means of a link 32 and is fulcrumed at its opposite end to a fixed object, such as the frame or casing of the scale mechanism. Obviously with a greater number of scale-beams than that illustrated in the drawings this system of connections, consisting of levers and links, could be extended proportionately, one end of the uppermost lever only being fulcrumed upon a fixed object, such as the casing of the scale apparatus.

Inasmuch as the connection between each scale-beam and the next of lower dnomination is by means of a lever to which the downward strain of a weight supported by the scale-platform is applied at an intermediate point, preferably contiguous to its center, it will be seen that a weight placed upon the scale-platform will first affect the uppermost scale-beam or that of lowest denomination, and as each of the connecting-levers is of the third order, whereby the increase due to the use of the lever is in motion instead of in power, it is obvious that a very slight movement of the platform-lever will be multiplied and produce an amplified movement of the uppermost weighing-beam. If the weight applied to the platform-lever is sufficient to carry the weighing-beam of lowest denomination to the limit of its upward movement, the point of connection of the link 32 with the heel of said lever of lowest denomination becomes fixed, thus securing both ends of the lever 31, whereupon any further or additional weight on the platform-lever will cause a swinging movement of the intermediate or connecting lever 28. This depresses the heel of the intermediate weighing-beam, and if this motion is continued until the said intermediate weighing-beam reaches the limit of its movement the point of connection of the link 29 to the heel of the intermediate scale-beam becomes fixed, thus securing both extremities of the lever 28 and bringing the intermediate or connecting lever 25 into operation, which in turn tends to depress the heel of the lowermost weighing-beam or that of highest denomination. In this way the several weighing-beams are brought successively into operation, beginning with the weighing-beam of lowest denomination and proceeding consecutively through the series, irrespective of the number which may be employed, until that of highest denomination is reached. In other words, the scale-beam of lowest denomination is operated from the platform-lever through series of connections, and the motion is amplified to insure a visible motion of said beam of lowest denomination without an excessive movement of the platform, and during this movement of the scale-beam of lowest denomination those ends of the intermediate or connecting levers 25 and 28 which are connected, respectively, with the scale-beams of intermediate and highest denomination remain fixed by reason of the weighing-poises thereon. Therefore all of the motion communicated by the rod 14 to the lowest connecting-lever is in turn communicated to the next lever, and so on to that which is in connection with the scale-beam of lowest denomination. If the weight upon the platform comes within the range of the beam of lowest denomination, the weight may be ascertained as in the ordinary practice. If the weight which has been applied to the platform exceeds that which can be weighed upon the scale-beam of lowest denomination, the latter is moved to the limit of the guide in which its free end is fitted, and motion is in turn communicated to the weighing-beam of next higher denomination. If the weight on the platform comes within the range of said second scale-beam, the weighing proceeds upon said second beam, as in the ordinary practice. If, on the other hand, the weight which is applied to the platform exceeds the capacity of the second scale-beam, the latter is moved to the limit of the guide in which its free end is fitted, and motion is then communicated to the scale-beam of next higher denomination, and so on, according to the number of weighing-beams in the series.

With a construction such as that above described the operation is as follows: When it is desired to weigh an empty vessel or receptacle—such as a vehicle, car, &c.—it is placed upon the platform and the weighing-poise upon the tare-beam is adjusted to balance the same. After the receptacle has been filled and is again placed upon the platform, the weighing-poise upon the tare-beam remaining as before adjusted and the weighing-poises on the weighing-beams being located at the outer extremities thereof, the operator, if neither of the weighing-beams is affected by the additional weight, moves the weighing-poise of the beam of lowest denomination inwardly or toward its fulcrum until a balance is effected, whereupon the registering graduation of the weighing-beam of lowest denomination will indicate the weight of the contents of the receptacle without the mental deduction necessary to distinguish the weight of the contents from the combined weight of the receptacle and contents. If, on the other hand, the weight of the receptacle and contents is sufficient to raise the beam of lowest denomination to the limit of its movement without affecting the beam of next higher denomination, the weighing-poise of said beam of next higher denomination is moved inwardly until a balance is effected, and the weight of the contents of the receptacle will be indicated upon said beam of higher denomination. In the same way a weight applied to the platform which is sufficient to raise all of the beams except that of highest denomination will indicate that the weight comes within the scope of said beam of highest denomination, and hence the weighing-poise of the lowest denomination should be adjusted inwardly until the proper balance is secured.

Various systems of marking the scale-beams may be adopted, and the weighing-poises may be of either equal or different weights to suit the desired capacity of the apparatus. In the construction illustrated in Fig. 3 the poises are of equal weight, and assuming that the scope of the beam of lowest denomination is one hundred pounds it will be seen that any weight coming within the scope of this scale-beam may be weighed thereon by the proper adjustment of the weighing-poise. If the weight of the object exceeds one hundred pounds, the poise on the beam of lowest denomination being at the outer extremity thereof or at the "100" mark, the scope of the beam of next higher denomination will be from one hundred to three hundred pounds owing to the fact that the connecting-levers of the third order cause each scale-beam to weigh twice as much for the same adjustment of the weighing-poise as the beam of next lower denomination. In other words, the connecting-levers of the third order increase the extent of the motion, but obviously reduce the application of pressure or weight. Therefore in said Fig. 2 the graduations of the second scale-beam range from "100" to "300." This same principle being followed out in connection with the third scale-beam and the graduations thereof beginning where the graduations of the beam of next lower denomination terminate, it will be seen that the graduations on the beam of next higher denomination will range from "300" to "900." Thus with weighing-poises of equal weight the capacity or scope of each weighing-beam is a multiple of that of the scale-beam of next lower denomination, and by making the connection between the suspending-links 27 and 30 with the connecting-levers practically at the centers of said connecting-levers (making, of course, due allowance for the varying distances between the points of connection of the links 26 and 29 with their respective scale-beams) the capacity of each scale-beam is just twice that of the scale-beam of next lower denomination; but it will be understood that this proportion or relation between the capacities of the scale-beams may be varied by suitably varying the points of connection of the said links 27 and 29 with the respective levers.

The capacity of the several scale-beams, however, may be proportionately varied by varying the weights of the weighing-poises. For instance, by making the weighing-poise of each weighing-beam of twice the weight of the weighing-poise upon the beam of next lower denomination, as indicated in Fig. 2, the capacity of the intermediate weighing-beam (which is doubled by reason of the connections and is again doubled by reason of the weighing-poise being of double the weight of that of the scale-beam of lowest denomination) is four times that of the scale-beam of lowest denomination, whereby, assuming that the range of graduations of the uppermost scale-beam is from "0" to "100," the range of graduations of the next scale-beam of higher denomination is from "100" to "500." Obviously, following the same proportion in connection with the next weighing-beam, (or that of highest denomination,) by making its weighing-poise twice that of the scale-beam of next lower denomination the capacity of the lowermost scale-beam will be indicated by its graduations as ranging from "500" to "2500."

With a scale constructed for far heavier weights, such as those used for cars, it will be seen that by adapting the scale-beam of lowest denomination to weigh from twenty-five to ten thousand the use of the successively-increased weighing-poises will adapt the second scale-beam to weigh from ten thousand to fifty thousand and the next beam of higher denomination from fifty thousand to two hundred and fifty thousand.

An important feature of the construction described resides in the fact that the operation of the tare-beam is practically independent of that of the weighing-beams in that the platform-lever has a slight movement independently of the connecting-rod 14, owing to a slight looseness of the connection between said lever and the connecting-rod, while the least motion of the platform-lever is communicated to the tare-beam. Hence the weight of a receptacle can be ascertained without affecting the main weighing-beams, and therefore in weighing a loaded receptacle the element of the weight of the receptacle itself may be entirely ignored, as the weighing-beams will indicate only the weight of the contents, due allowance being made by means of the tare-beam for the weight of the receptacle in accordance with the adjustment of the poise on the tare-beam prior to the loading of the receptacle. Furthermore, it will be seen that the connection between the platform-lever and the tare-beam, which includes a lever of the second order, is a motion-reducing connection in that the motion which is imparted to the lever at its free end is communicated to the tare-beam from an intermediate point, and hence through a distance which is less than that through which the end of the lever moves. On the other hand, the connections between the platform-lever and the weighing-beams are of motion-increasing effect in that motion is imparted thereto at intermediate points and is communicated thereby from their extremities. Thus in the operation of the scale the motion is communicated from the platform-lever through motion-reducing connections to the tare-beam, whereby the latter moves through a relatively small arc, while the connections between the platform-lever and the weighing-beams serve to multiply or increase the motion, whereby the weighing-beams operate through relatively-greater intervals, and therefore after the initial operation of the tare-beam the weighing-beams may be successively brought into operation to weigh the contents of the receptacle or vehicle without interference by the tare-beam and connections with the operation of said weighing-beams.

In order to insure accuracy in weighing, I construct the weighing-poises with terminal slides or bearing-keepers 33, between which and parallel with the scale-beam is arranged a graduated fractional bar 34, designed to indicate the fractional parts of the graduations formed upon the beam traversed by the poise, and upon this fractional bar is mounted an auxiliary poise 35, adjustable independently of the main poise and adapted for movement in either direction from an intermediate point of the fractional bar to indicate fractional parts of the amounts designated by the graduations of the scale-beam. For instance, if the graduations of the scale-beam indicate one hundred pounds each the fractional bar may be graduated to designate ten pounds each or one pound each.

In Fig. 3 I have shown double or multiple poises as being adapted to attain the necessary accuracy in weighing without the close graduation of the scale-beam; but it will be understood that scales which do not range in capacity from nine hundred pounds and others which are adapted for counter use, &c., may be provided with the ordinary ball-poises, as will be readily understood by those conversant with the art to which my invention belongs.

Various changes in the form, proportion, and the minor details of construction may be resorted to without departing from the spirit or sacrificing any of the advantages of this invention.

Having described my invention, what I claim is—

1. In a weighing-scale, the combination with a platform-lever, of a tare-beam having an adjustable poise, a weighing-beam also having an adjustable poise, a motion-communicating connection between the platform-lever and the tare-beam, and an independent motion-communicating connection between the platform-lever and the weighing-beam, whereby the platform-lever may impart differential throws to said beams, substantially as specified.

2. In a weighing-scale, the combination with a platform-lever, of a tare-beam provided with an adjustable poise, a weighing-beam also provided with an adjustable poise, and independent connections between the platform-lever and said beams for communicating the motion of the lever successively to the tare-beam and the weighing-beam, the connections of the tare-beam including a lever of the second order, substantially as specified.

3. In a weighing-scale, the combination of a series of weighing-beams provided with independent weighing-poises, means for limiting the weighing movements of said beams, and a series of connections between the weighing-beams for communicating motion from one beam to the next, successively, said connections including levers of the third order, to one of which is connected the scale or platform rod, substantially as specified.

4. In a weighing-scale, a series of weighing-beams provided with independent poises, stops for limiting the weighing movements, respectively, of said beams for communicating motion from one beam to the next, successively, said connections, and connections between the beams consisting of levers of the third order, one end of each of which is suspended from a weighing-beam, and means for connecting the other ends of the levers of higher denomination with intermediate points of the next levers of lower denomination, the weight or platform-rod being connected with the lever of highest denomination, substantially as specified.

5. In a weighing-scale, the combination of weighing-beams provided with independent weighing-poises, connecting-levers of the third order, each of which is connected at one end with the heel of one of the weighing-beams, the other end of each lever of higher denomination being connected with an intermediate point of the lever of next lower denomination, the lever of lowest denomination having a fixed terminal fulcrum, and means for applying weight to an intermediate point of the lever of highest denomination, substantially as specified.

6. In a weighing-scale, the combination with weighing-beams, connections between the heels of the weighing-beams, including levers of the third order, and connections between each lever of higher denomination and the next of lower denomination, the weight or platform-rod being connected with the lever of highest denomination, and adjustable poises mounted respectively upon the weighing-beams, and each having an auxiliary poise adjustable parallel with the beam, substantially as specified.

7. In a weighing-scale, the combination of a series of weighing-beams of different denominations provided with independent weighing-poises, means for limiting the weighing movements of said beams, and a series of connections for communicating motion successively to beams of lower and higher denomination, the weight or platform-rod being applied to the connection of highest denomination, and each connection becoming operative to communicate motion as the beam of lower denomination is checked at the limit of its weighing movement, substantially as specified.

8. In a weighing-scale, the combination with weighing-beams of different denominations, connections between the heels of the weighing-beams, including levers, and connections between each lever of higher denomination and the next of lower denomination, the weight or platform-rod being connected with the lever of highest denomination, and poises mounted respectively upon the weighing-beams, substantially as specified.

In testimony that I claim the foregoing as my own I have hereto affixed my signature in the presence of two witnesses.

CHESTER L. BELL.

Witnesses:
W. S. SMALLWOOD,
JOS. N. SWEENEY.